(12) United States Patent
Wurm

(10) Patent No.: US 8,055,205 B2
(45) Date of Patent: Nov. 8, 2011

(54) ASSESSING THE PERFORMANCE OF RADIO DEVICES

(75) Inventor: Patrick Wurm, Voreppe (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 821 days.

(21) Appl. No.: 11/872,199

(22) Filed: Oct. 15, 2007

(65) Prior Publication Data

US 2008/0153436 A1 Jun. 26, 2008

(30) Foreign Application Priority Data

Apr. 22, 2005 (GB) .................................. 0508205.2
Apr. 18, 2006 (WO) ................ PCT/GB2006/001398

(51) Int. Cl.
*H04B 17/00* (2006.01)
*H03C 1/62* (2006.01)
*H04W 24/00* (2009.01)

(52) U.S. Cl. ............... 455/67.11; 455/115.1; 455/115.4; 455/423

(58) Field of Classification Search ............... 455/67.11, 455/67.14, 405, 423, 115.1–115.4, 226.1–226.4
See application file for complete search history.

(56) References Cited

U.S. PATENT DOCUMENTS

| | | | |
|---|---|---|---|
| 5,574,994 A | 11/1996 | Huang et al. | |
| 6,393,258 B1 | 5/2002 | Gambina et al. | |
| 6,434,204 B1 | 8/2002 | Amir et al. | |
| 6,980,811 B2 * | 12/2005 | Harris | 455/452.1 |
| 7,369,813 B2 | 5/2008 | Andersson | |
| 2004/0132424 A1 | 7/2004 | Aytur et al. | |
| 2004/0230393 A1 | 11/2004 | Andersson | |

FOREIGN PATENT DOCUMENTS

| | | |
|---|---|---|
| WO | 0225846 A2 | 3/2002 |
| WO | 2005002063 A2 | 1/2005 |

* cited by examiner

*Primary Examiner* — Eugene Yun
(74) *Attorney, Agent, or Firm* — Edell, Shapiro & Finnan, LLC

(57) ABSTRACT

A method of assessing the performance of a radio transmitting means of, or intended for use in, a user terminal of a mobile telecommunications network, the transmitting means having a plurality of correction factors that are adjustable for improving the performance of the transmitting means and whose values together define a point in a correction space, the method comprising allocating values to the factors to specify a point in the space, measuring the performance of the transmitting means to determine as an error distance the distance of said point from an optimum point in said space that gives best performance of the transmitting means in terms of said factors and using said distance in the identification of said optimum point. Corresponding program code and apparatus is also envisaged.

15 Claims, 4 Drawing Sheets

ASSESSING THE PERFORMANCE OF RADIO DEVICES

FIELD OF THE INVENTION

The invention relates to methods of, and apparatus for, assessing the performance of radio transmitting equipment.

BACKGROUND OF THE INVENTION

On the production line, mobile telephone handset manufacturers often face a need to cancel out carrier leakage at the antenna port, i.e. the port that delivers radio frequency signals to the handset's antenna for transmission. "Carrier leakage" is sometimes called "origin offset" or even "DC offset". Presently, most manufacturers use simple but inaccurate or more accurate but time consuming methods for carrier leakage cancellation. An ideal carrier leakage cancellation scheme would provide accurate calibration in as short a time as possible in order to optimise the throughput of a handset production line.

A GSM handset manufacturer who wishes to bring a handset design into production must ensure that the handset passes a large number of tests (as defined in the 3GPP standards) relating to its RF performance. One of these test verifies whether the carrier leakage of the handset is below a specified value.

The 3GPP standards stipulate that the carrier leakage at the antenna port of a handset must always be better than −30 dBc when transmitting an EDGE or GMSK modulated signal. Achieving this level of performance may not seem very difficult but there are many factors that contribute towards carrier leakage and lead towards failure of the carrier leakage test.

It is conventional to regard the signal processing within a mobile telephone handset as divided into RF signal processing and base band signal processing. Typically, the RF processing is carried out by an RF or radio chip and the base band processing is performed by a base band chip. Amongst other tasks, a base band chip will typically be configured to take information that is to be transmitted from the handset and convert that information into a base band signal in quadrature format comprising I and Q differential signals. The quadrature format base band signal is then supplied to the radio chip for modulation on to an RF carrier signal. The RF chip then delivers the modulated RF signal into an antenna port leading to the handset's antenna for transmission.

In a handset of the general type described in the proceeding paragraph, there are two main contributors to carrier leakage appearing in the signal delivered by the RF chip to the antenna port. First, there may be DC offsets in the I and Q differential signals delivered by the base band chip to the radio chip. These DC offsets are due to the design of the base band chip. Second, defects in the radio chip may cause the RF carrier signal on to which the base band signal is modulated to leak into the output of the modulation process. As both of these contributors are completely uncorrelated, they may cancel one another but, alternatively, they may reinforce one another.

In order to pass carrier leakage tests, different handset manufacturers apply different strategies depending on the performance of their base band and radio chips. For example:

Very tight manufacturing tolerance may be imposed on the base band and radio chips themselves. However, this can decrease the yield of the manufacturing process thereby leading to increased costs.

Base band chips can be provided with technology that enables them to cancel DC offsets appearing in the differential I and Q signals that are delivered to the radio chip. Where such technology is used, the need to calibrate a handset to meet a carrier leakage test usually depends on the performance of the radio chip.

If the amount of carrier leakage attributable to a radio chip is statistically not good enough, which is commonly the case, then it becomes necessary to perform a calibration process on the RF signal that is delivered from the radio chip to the antenna port in order to reduce the total carrier leakage for the handset.

Typically, a calibration process of this kind uses registers within the base band chip to compensate for the total carrier leakage (i.e. arising from both the base band chip and the radio chip) by deliberately introducing corrective DC offsets in the differential I and Q signals that are delivered by the base band chip to the radio chip. However, since every handset moving along a production line with require calibration, it is important to make the calibration time as short as possible in order to maximise the throughput of the production line. A conventional calibration scheme of this kind will now be described.

The DC offsets provided to the differential I and Q signals delivered by the base band chip in order to suppress carrier leakage in the output of the RF chip are determined by a pair of programmable registers in the base band chip. One of the registers controls the DC offset that appears in the differential signal that is the I component of the signal delivered to the radio chip, whilst the other register provides the same function for the differential signal that is the Q component of the quadrature signal that is delivered to the radio chip.

The values held in the registers are stepped across their entire ranges and, for each possible combination of the values of the two registers, the carrier leakage at the output of the RF chip is measured using a power meter and recorded in a computer memory. Provided that the ranges used by the registers are wide enough, then the captured data should display a minimum carrier leakage value indicating the best pair of values to use in the two registers. FIG. 1 plots mean carrier leakage against the values of the two registers, which are referred to as Q OFFSET and I OFFSET in FIG. 1. Clearly, the pair of register values that produces the lowest carrier leakage at the output of the RF chip lies at the bottom of the well that appears in the mean carrier leakage surface in FIG. 1.

The calibration process described in the two preceding paragraphs suffers in that it can be time consuming to complete. The problem is exacerbated since manufacturers need to provide broad ranges for the registers to cater for the extreme carrier leakage values that might be encountered in handsets on a production line, even though the worst-case carrier leakage is likely to occur only infrequently.

SUMMARY OF THE INVENTION

According to one aspect, the invention provides a method of assessing the performance of a radio transmitting means of, or intended for use in, a user terminal of a mobile telecommunications network, the transmitting means having a plurality of correction factors that are adjustable for improving the performance of the transmitting means and whose values together define a point in a correction space, the method comprising allocating values to the factors to specify a point in the space, measuring the performance of the transmitting means to determine as an error distance the distance of said point from an optimum point in said space that gives best performance of the transmitting means in terms of said factors and using said distance in the identification of said optimum point.

The invention also consists in apparatus for assessing the performance of a radio transmitting means of, or intended for use in, a user terminal of a mobile telecommunications network, the transmitting means having a plurality of correction factors that are adjustable for improving the performance of the transmitting means and whose values together define a point in a correction space, the apparatus comprising means for allocating values to the factors to specify a point in the space, means for measuring the performance of the transmitting means to determine as an error distance the distance of said point from an optimum point in said space that gives best performance of the transmitting means in terms of said factors and means for identifying said optimum point using said distance.

The invention thus provides useful data that can be used in locating the optimum point in the correction space.

In certain embodiments, the process of identifying this optimum point is achieved on the basis of triangulation by determining for several points in the correction space corresponding error distances. In the case where there are more than two correction factors, the "triangulation" process may be required to be a non-planar process in order to locate the optimum correction space point. The triangulation may produce a result that is, to some degree, imprecise. For example, the triangulation process may indicate that the optimum correction space point is one of several correction space points permitted by the resolution of the correction factors.

In certain embodiments employing triangulation, uncertainty in the triangulation results may arise due, at least in part, to uncertainty in some operating parameter of the transmitting means (e.g. the amplitude of the I and Q differential signals emitted by a base band chip within the transmitting means) that is used to measure error distances for the triangulation process. In such situations, the value of the operating parameter concerned may be varied to seek a value that reduces the uncertainty in the triangulation result.

In certain embodiments where the transmitting means modulates an information signal on to a carrier signal, carrier leakage in the carrier signal after modulation with the information signal is detected and used in conjunction with the correction factor values and the amplitude of the information signal in order to deduce the error distance between the correction space points defined by the current and optimum values of the correction factors.

Once an optimum correction space point is located, the corresponding correction factor values can be deployed within the transmitting means in order to calibrate it.

The invention is used to assess the performance of a radio transmitting device within, or intended to form part of, a user terminal of a telecommunications network. In this context, a user terminal is likely to be a mobile telephone (or cell phone) but this is not necessarily always the case. For example, the user terminal may be a communications module within a vending machine. In other embodiments, the radio transmitting means is not associated with a user terminal of a telecommunications network but instead is associated with some other participant of a network, such as a base station.

The radio device performance assessment according to the invention, and any associated correction factor calibration, might, for example, take place during production of the user terminal that is to incorporate the radio device under test or during the post production lifetime of the user terminal, perhaps on a periodic basis to counter component ageing.

The present invention may be implemented using software. For example, a software engineer could easily create programme code for implementing the error distance calculations in the correction space and/or the triangulation process for locating the optimum correction space point based on several error distance measurements.

BRIEF DESCRIPTION OF THE DRAWINGS

By way of example only, several embodiments of the invention will now be described with reference to the accompanying drawings, in which.

DETAILED DESCRIPTION OF THE PREFERRED EMBODIMENTS

Figure 1:
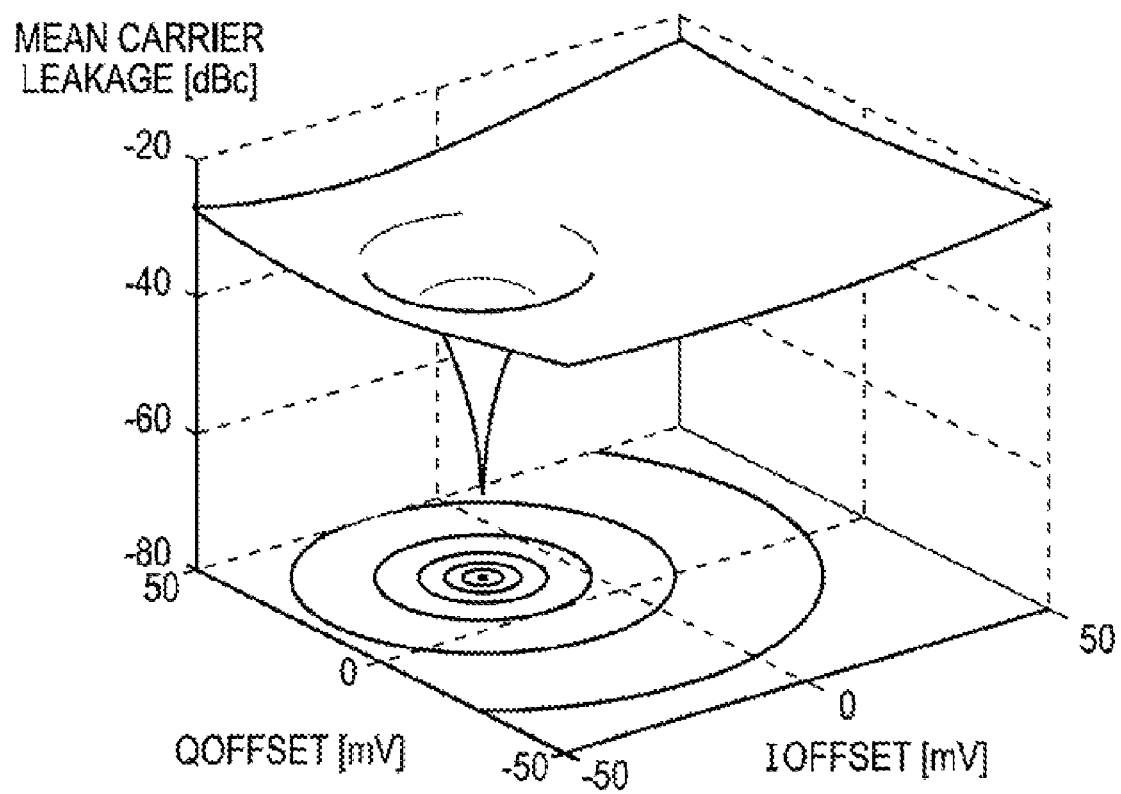
FIG. 1 illustrates a carrier leakage surface plotted from data that would be obtained using a conventional carrier leakage calibration process.
Figure 2:
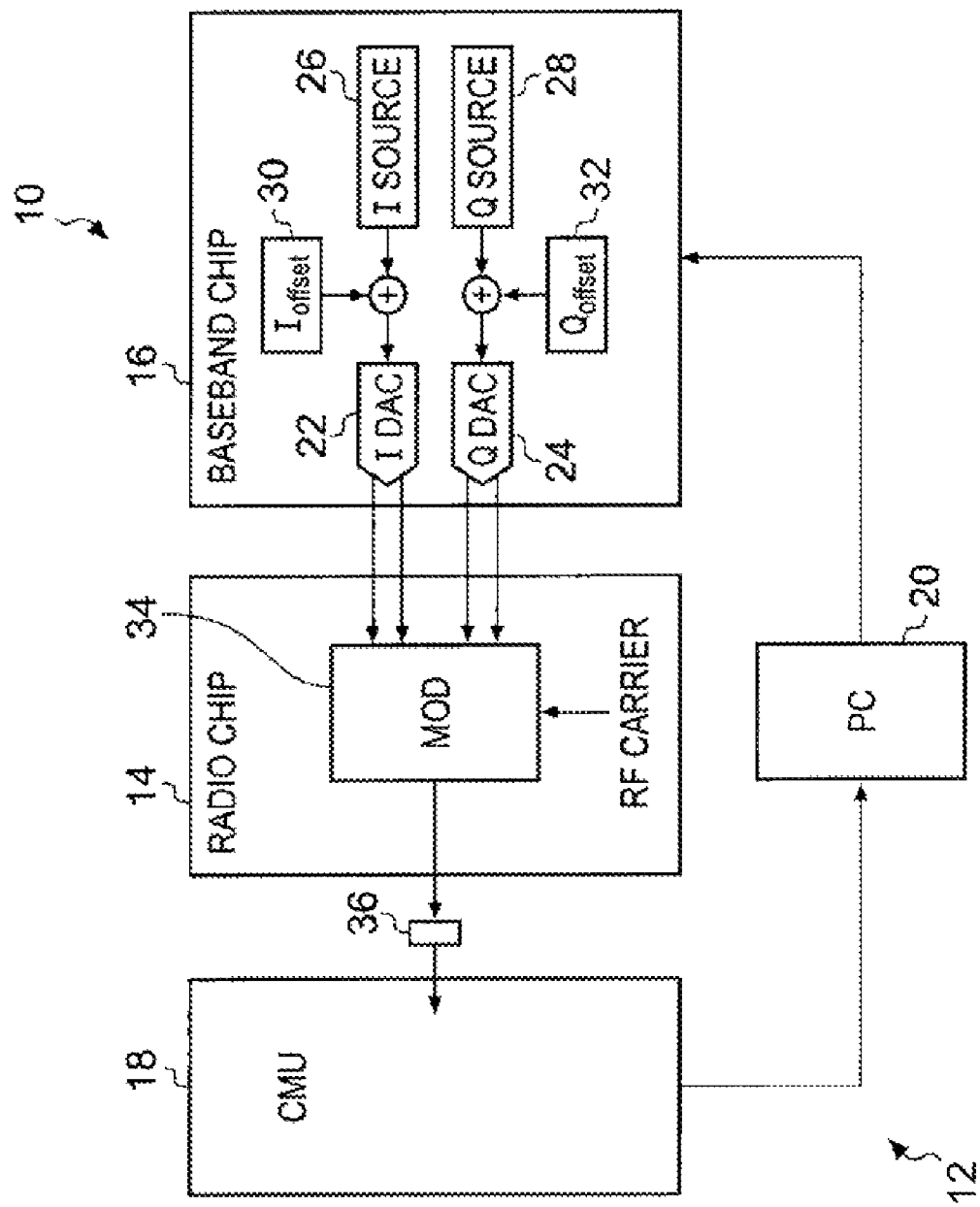
FIG. 2 illustrates, schematically and at a high level showing only the components necessary for achieving an understanding of the embodiment, a mobile telephone handset connected to a carrier leakage calibration unit.

FIG. 1 illustrates a mobile telephone handset 10 in production. The handset 10 is connected to a carrier leakage calibration unit 12. The handset comprises a radio chip 14 and a base band chip 16. In practice, the handset 10 will comprise many other elements but these are not shown for the sake of clarity. Only the components of the handset 10 that are relevant for understanding the operation of the embodiment are illustrated. The calibration unit 12 comprises a carrier leak measurement unit (CMU) 18, such as a Rhode & Schwartz CMU 200, connected to a personal computer (PC) 20. The PC 20 is also connected to the base band chip 16.

The base band chip 16 provides a quadrature format base band signal for the radio chip 14 to modulate on to an RF carrier signal. The I and Q components of this quadrature signal are differential signals supplied by respective differential digital to analogue converters (DACs) 22 and 24. No detail will be given about the production of the signals on which the DACs 22 and 24 operate in order to produce the quadrature signal that is supplied to the radio chip 14 since such information is not relevant for the purposes of rendering an explanation of an embodiment of the invention and such information is in any event widely understood in the art. For the purposes of this document, the origins of the signals on which DACs 22 and 24 operate will simply be described, respectively, as I and Q data sources 26 and 28.

The base band chip 16 further comprises two offset registers 30 and 32. The base band chip 30 is arranged to sum the content of register 30 with the data stream provided by the I channel data source 26 to the I channel DAC 22. In a similar fashion, the value held in register 32 is summed with the data stream provided by the Q channel data source 28. The registers 30 and 32 are programmable and can be loaded with positive or negative values for the purpose of increasing or decreasing the data values emanating from source 26 and 28. In this way, the contents of the registers 30 and 32 are said to offset the data streams provided to the DACs 22 and 24 and thus the registers 30 and 32 will be referred to as offset registers. The value stored in register 30 will be referred to as Ioffset and the value held by register 32 will be referred to as Qoffset. The purpose of providing the offset registers 30 and 32 for adjusting the inputs to the DACs 22 and 24 will be described shortly.

The quadrature format information signal produced by the DACs 22 and 24 is supplied to the radio chip 14. The radio chip 14 contains a modulator 34 that modulates the quadrature format information signal on to an RF carrier signal. The modulated RF carrier signal produced by the modulator 34 is supplied from the radio chip 14 to the input port 36 of the antenna (not shown) of the handset 10. The CMU 18 of the calibration unit 12 is connected to the port 36 for the purpose of measuring the carrier leakage power in the signal that is delivered to the port 36 from the radio chip 14. The CMU 18 calculates periodic average carrier leakage power values, which are transmitted to the PC 20. The PC 20 analyses the mean carrier leakage power values and determines optimum values to be stored in the offset of registers 30 and 32 for minimising carrier leakage in the signal that the radio chip 14 delivers to port 36. The algorithm that is used within PC 20 to determine the values loaded into registers 30 and 32 will now be described.

The purpose of the calibration unit 12 is to locate the optimum values that should be programmed into the offset registers 30 and 32 in order to minimise carrier leakage in the signal that the radio chip 14 presents to port 36. It is possible to consider the offset registers 30 and 32 as the orthogonal axes of a two dimensional correction plane. Of course, if the handset 10 featured other parameters that could be adjusted under the control of the calibration unit 12 in order to suppress the carrier leakage, then the correction space will no longer be a two dimensional correction plane but instead becomes a correction space with a number of dimensions equal to the number of parameters of the handset that the calibration unit 18 can control in seeking a minimum carrier leakage value.

The optimum values for registers 30 and 32 specify an optimum correction point POPT in the two dimensional correction space. If arbitrary values are programmed into registers 30 and 32, then the arbitrary point thus specified in the correction space is connected to the optimum correction point by an error vector. For example, consider that the optimum correction space point ($I_{offset}^{OPT}$, $Q_{offset}^{OPT}$) is (−10, 10) in mV. If the offset registers 30 and 32 are arbitrarily programmed so that they specify the point (0, 10) mV in the correction space, then the resulting error vector is (−10, 0) mV. It is possible to deduce the modulus of the error vector, which in the previous example is 10 mV, from average carrier leakage measurements performed by the CMU 18. The optimum correction space point can be calculated from error vector moduli using the assumption that average carrier leakage power is a monotonic function of error vector modulus in that the smaller the modulus, the lower the average carrier leakage power is.

The measurement of the modulus of an error vector from an arbitrary point in the correction space identifies a circle centred on the correction space point on whose circumference the optimum correction space point should lie. Hence, error vector modulus should be referred to as error radius. The error vector modulus or error radius is given by the equation:

$$\text{Radius} = \sqrt{(I_{offset} - I_{offset}^{OPT})^2 + (Q_{offset} - Q_{offset}^{OPT})^2} \text{ mV}$$

In the above equation, (Ioffset, Qoffset) represents the arbitrary correction space point.

A mean carrier leak power measurement is related to error radius by the equation:

$$\text{MeanCarrierLeak} = 20 \cdot \log_{10}\left(\frac{\text{Radius}}{\text{Mean\_Signal\_Level}}\right) \text{ dBc}$$

The "mean signal level" is the amplitude of the quadrature format base band signal supplied from DACs 22 and 24. The optimum correction space point can be deduced from just three error radii calculated from three different correction space points. For example, the three correction space points could be:

$$P1 = (I_{offset}, Q_{offset}) = (+R, -R) \quad\quad 1$$

$$P2 = (I_{offset}, Q_{offset}) = (-R, -R) \quad\quad 2$$

$$P3 = (I_{offset}, Q_{offset}) = (0, +R) \quad\quad 3$$

Figure 3:
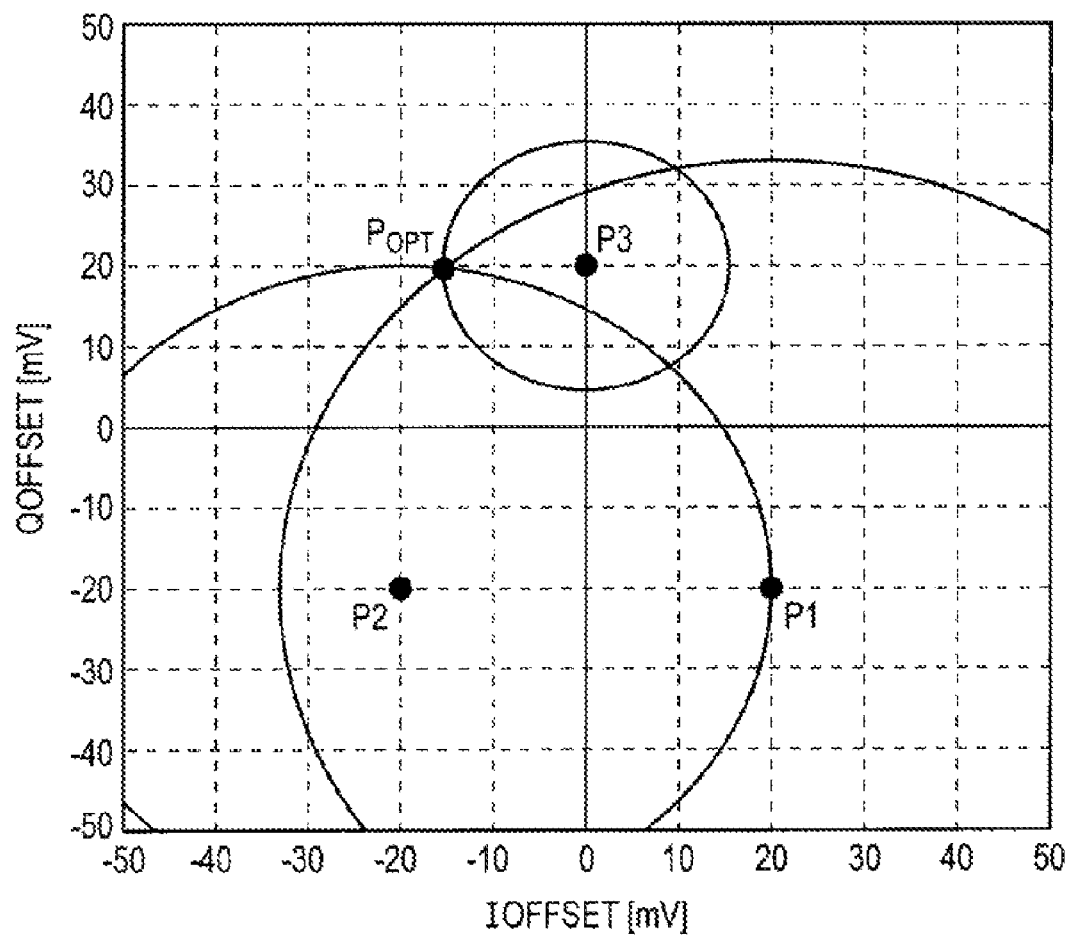
FIG. 3 is a diagram illustrating the triangulation process performed by the calibration unit of FIG. 2.

In the foregoing sets of coordinates, R is an arbitrary value. In FIG. 3, for example, R is 20 mV.

In the case of FIG. 3, where mean carrier leakage powers CL1, CL2 and CL3 [dBc] are measured for correction space points P1, P2 and P3 respectively, then error radii R1, R2 and R3 [mV] for points P1, P2 and P3, respectively, can be calculated as follows:

$$R_1 = \text{Mean\_Signal\_Level} \cdot 10^{\frac{CL_1}{20}}$$

$$R_2 = \text{Mean\_Signal\_Level} \cdot 10^{\frac{CL_2}{20}}$$

$$R_3 = \text{Mean\_Signal\_Level} \cdot 10^{\frac{CL_3}{20}}$$

However, the three error radii are also given by the equations:

$$R_1 = \sqrt{(R - I_{offset}^{OPT})^2 + (-R - Q_{offset}^{OPT})^2} \text{ in[mV]}$$

$$R_2 = \sqrt{(-R - I_{offset}^{OPT})^2 + (-R - Q_{offset}^{OPT})^2} \text{ in[mV]}$$

$$R_3 = \sqrt{(I_{offset}^{OPT})^2 + (R - Q_{offset}^{OPT})^2} \text{ in[mV]}$$

Values of R1, R2 and R3 from the mean carrier leakage power measurements can be inserted into the above equations, which can then be solved to determine the optimum correction space point;

$$I_{offset}^{OPT} = \frac{R_2^2 - R_1^2}{4 \cdot R}$$

$$Q_{offset}^{OPT} = \frac{-2 \cdot R_3^2 + R_1^2 + R_2^2 - 2 \cdot R^2}{8 \cdot R}$$

The processing of the mean carrier leakage power values yielded by the CMU 18 is done by the PC 20. Once the optimum correction space point ($I_{offset}^{OPT}$, $Q_{offset}^{OPT}$) has been deduced by the PC, the PC then proceeds to load the value ($I_{offset}^{OPT}$) into offset register 30 and value ($Q_{offset}^{OPT}$) into register 32.

FIG. 3 illustrates diagrammatically the process of locating the optimum correction space point (labelled POPT in FIG. 3) from mean carrier leakage power measurements done for correction space points P1, P2 and P3. As shown in FIG. 3, the differing error radii deduced for P1, P2 and P3 from the mean carrier leakage power measurements yield three circles that have a single point of mutual intersection that identifies POPT.

In some practical cases, the three circles shown in FIG. 3 will not mutually intersect. In such cases, the correction space point that emerges from the foregoing algorithm is more properly labelled PCAL to distinguish it from POPT.

In practice, a major contributor to the discrepancy between PCAL and POPT is variation of the mean signal level, i.e. the amplitude of the signal delivered by DACs 22 and 24, about its nominal design value due to the manufacturing tolerances applicable to the base band chip 16. An embodiment of the invention that addresses this source of discrepancy between POPT and PCAL will now be described.

It is clear from the equations presented earlier that the mean signal level, or MSL, of the base band chip 16 controls the error radii that are determined from the mean carrier leakage measurements. For example, if the nominal MSL used to calculate the error radii is too low, then the radii of the circles shown in FIG. 3 will be too small and the circles will fail to have a point of mutual intersection. Likewise, if the nominal MSL that is used to calculate the error radii is too high, the radii of the circles in FIG. 3 will be too large and the circles will again fail to have a point of mutual intersection. Accordingly, in this embodiment, the MSL is treated as a variable and an error function e is used to determine the optimum value of the MSL. In essence, for each value of the MSL, PCAL and e are deduced. Once values of PCAL and e have been calculated for each value of the MSL, the PC 20 loads into registers 30 and 32 the component values of the PCAL that has the lowest value of the error function e. The error function e is the sum of three errors e1, e2 and e3. Error e1 calculates how distant PCAL is from the circle centred on P1. Error e2 calculates how distant PCAL is from the circle centred on P2. Error e3 calculates how distant PCAL is from the circle centred on P3. It will be apparent that when the three circles mutually intersect, e1, e2 and e3 are all zero. In practical terms, however, the closer the circles get to mutual intersection, the smaller e becomes and the nearer PCAL gets to POPT.

In the context of this embodiment, it is appropriate to regard the variable MSL as an array of values MSL (u) such that the components of PCAL, i.e. $I_{offset}^{CAL}$ and $Q_{offset}^{CAL}$, and the error e become arrays $I_{offset}^{CAL}(u)$, $Q_{offset}^{CAL}(u)$ and e (u).

Figure 4:
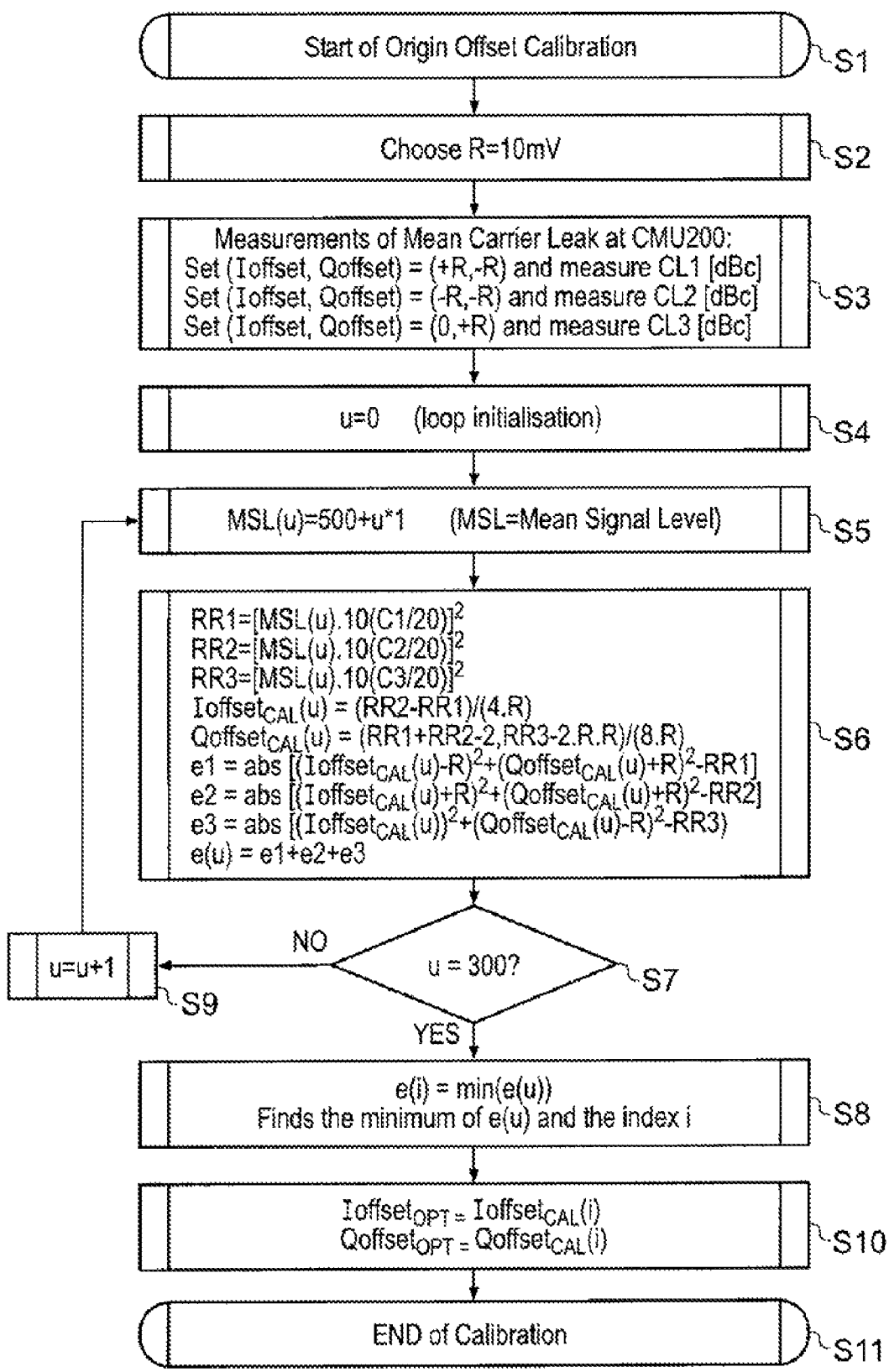
FIG. 4 is a flowchart illustrating an algorithm that can be used for the triangulation process illustrated in FIG. 3.

FIG. 4 presents a flowchart illustrating how POPT is deduced in this embodiment.

In step S1, the carrier leakage calibration process is initiated. In step S2, a value is selected for R. In step S3 the mean carrier leakage power is measured at points P1, P2 and P3 in the correction space. Thus far, the algorithm for deducing PCAL operates as in the previous embodiment. However, in step S4, array index u is initialised and it is at this point that the calibration algorithms of the two embodiments diverge. In step S5, an element MSL(u) is retrieved from the array of MSL values. In this example, the MSL values range from 500 to 800 in increments of 1 and represent a range of 500 to 800 millivolts. In fact, as shown in step S5, it is possible to replace the array of MSL values with a function of u.

In step S6, the error radii R1, R2, and R3 are calculated using the equations provided earlier that relate error radius with MSL, R and mean carrier leakage power. In the flowchart, RR1, RR2 and RR3 correspond to $R_1^2$, $R_2^2$ and $R_3^2$, respectively and C1, C2 and C3 correspond, respectively, to CL1, CL2 and CL3 and R is again allocated the value 20 mV. Following calculation of the error radii, step S6 then proceeds to calculate $I_{offset}^{CAL}(u)$ and $Q_{offset}^{CAL}(u)$ from the value R and the three error radii using the equations presented earlier. $I_{offset}^{CAL}(u)$ and $Q_{offset}^{CAL}(u)$ are then used to calculate, using the equations shown in step S6, values for the temporary variables e1, e2 and e3, which are then summed to produce a value for the error e(u).

In step S7, the index u is tested to determine if it has reached the value of 300. If u has reached 300, then the process moves to step S8. On the other hand, if u has not yet reached 300, then the process moves to step S9, in which the index u is incremented by one. From step S9, the process returns to step S5 so that values of $I_{offset}^{CAL}(u)$, $Q_{offset}^{CAL}(u)$ and e(u) can be calculated for the new value of index u.

The process moves to step S8 once the arrays $I_{offset}^{CAL}(u)$, $Q_{offset}^{CAL}(u)$ and e(u) have been fully populated. In step S8, the array of e values is examined to determine the minimum e value. The value of u for the minimum value of e is labelled i and, in step S10, POPT is set as the pair of values $I_{offset}^{CAL}(i)$ and $Q_{offset}^{CAL}(i)$. The process then moves to step S11 and terminates.

The process of determining POPT from the mean carrier leakage power measurements using the flowchart of FIG. 4 takes less than 1 second on a standard PC. However, it is possible to alter the algorithm presented in FIG. 4 to further increase the speed of operation. For example, rather than incrementing the parameter MSL by 1 in a linear sweep, it is possible instead to increment the parameter MSL in coarser steps beginning at the low end of the range whilst verifying for each step that the error function e is lower than for the previous step. If, however, the error function is deduced to be higher than for the previous step, then the step direction is reversed and the step amplitude decreased (for example, to 50% of its previous value). This process is then repeated so that the MSL converges to an optimum value by a directed search.

In the embodiments described thus far, the carrier leakage calibration unit 12 has been used to test mobile telephone handsets on a production line. However, it is entirely possible to integrate the functionality of the calibration unit 12 within the handset 10 for the purpose of performing carrier leakage calibration as desired throughout the operating lifetime of the handset. In this case, the functionality of the CMU 18 is integrated within the handset 10 and the functions of the carrier leakage calibration process that are performed by the PC 20 in the proceeding embodiments are instead provided by data processing and data storage resources internal to the handset 10. With the functionality of the calibration unit 12 incorporated within the handset 10, the handset conducts carrier leakage calibration by transmitting three short transmissions of an unmodulated carrier signal using a different correction space setting of registers 30 and 32 for each transmission. The actual power of the signal delivered to port 36 is then measured for each of the transmissions and the optimum correction space point is deduced from the measurements using, for example, the control processor (not shown) of the handset 10 to perform one of the carrier leakage calibration algorithms described above.

The invention claimed is:

1. A method of assessing the performance of a radio transmitting means of, or intended for use in, a user terminal of a mobile telecommunications network, the transmitting means having a plurality of correction factors that are adjustable for improving the performance of the transmitting means and whose values together define a point in a correction space, the method comprising:

allocating values to the factors to specify a point in the space;

measuring the performance of the transmitting means to determine as an error distance the distance of said point from an optimum point in said space that gives best performance of the transmitting means in terms of said factors; and using said distance in the identification of said optimum point, wherein the correction factors are I and Q offset values that are mixed, respectively, with an I component and a Q component of a signal that is being passed to a radio frequency modulator.

2. A method according to claim 1, wherein the process of identifying said optimum point comprises triangulating to said optimum point by using a plurality of points in said space together with their associated distances to said optimum point.

3. A method according to claim 2, wherein uncertainty in the value of an operating parameter of the transmitting means that is used to calculate distances in said space in said triangulation process produces uncertainty in the triangulation results and the value of said operating parameter is varied to seek a value that reduces the uncertainty in the triangulation results.

4. A method according to claim 1, wherein the transmitting means is arranged to modulate an information signal on to a carrier signal and the measurement process is arranged to measure an error distance by measuring carrier leakage in the carrier signal modulated with the information signal and using the measured carrier leakage, the correction factor values and the information signal amplitude to measure the error distance between the point defined by the correction factor values and said optimum point.

5. A method according to claim 1, further comprising adjusting the values of the correction factors so that they specify the deduced optimum point.

6. A method according to claim 1, wherein said space is planar.

7. A method according to claim 1, wherein there are two correction factors and their values specify a point in said space.

8. Apparatus for assessing the performance of a radio transmitting means of, or intended for use in, a user terminal of a mobile telecommunications network, the transmitting means having a plurality of correction factors that are adjustable for improving the performance of the transmitting means and whose values together define a point in a correction space, the apparatus comprising:

means for allocating values to the factors to specify a point in the space;

means for measuring the performance of the transmitting means to determine as an error distance the distance of said point from an optimum point in said space that gives best performance of the transmitting means in terms of said factors; and means for identifying said optimum point using said distance, wherein the correction factors are I and Q offset values that are mixed, respectively, with an I component and a Q component of a signal that is to be passed to a radio frequency modulator.

9. Apparatus according to claim 8, wherein the identifying means is arranged to triangulate to said optimum point by using a plurality of points in said space together with their associated distances to said optimum point.

10. Apparatus according to claim 9, wherein uncertainty in the value of an operating parameter of the transmitting means that is used to calculate distances in said space in said triangulation process produces uncertainty in the triangulation results and the identifying means is arranged to vary the value of said operating parameter to seek a value of that parameter that reduces the uncertainty in the triangulation results.

11. Apparatus according to claim 8, wherein the transmitting means is arranged to modulate an information signal on to a carrier signal and the measuring means is arranged to measure an error distance by measuring carrier leakage in the carrier signal modulated with the information signal and to use the measured carrier leakage, the correction factor values and the information signal amplitude to measure the error distance between the point defined by the correction factor values and said optimum point.

12. Apparatus according to claim 8, further comprising means for adjusting values of the correction factors so that they specify the deduced optimum point.

13. Apparatus according to claim 8, wherein said space is planar.

14. Apparatus according to claim 8, wherein there are two correction factors and their values specify a point in said space.

15. A user terminal of a mobile telecommunications network, comprising radio transmitting means and apparatus according to claim 8 for assessing the performance of the radio transmitting means.

* * * * *